May 2, 1933.  A. ZENKNER  1,906,299

RESONANT CONTROL MECHANISM

Filed May 12, 1931

Inventor
Arthur Zenkner
by John D. Morgan
atty.

Patented May 2, 1933

1,906,299

UNITED STATES PATENT OFFICE

ARTHUR ZENKNER, OF ZUG, SWITZERLAND, ASSIGNOR TO LANDIS & GYR, A-G., OF ZUG, SWITZERLAND, A CORPORATION OF SWITZERLAND

RESONANT CONTROL MECHANISM

Application filed May 12, 1931, Serial No. 536,797, and in Switzerland June 12, 1930.

The present invention relates to a frequency-responsive device for effecting the distant control of various apparatus having alternative operations, and more particularly to such a device for controlling the operation of electric switches or multiple tariff meters.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Of the drawing:—

Figure 1:
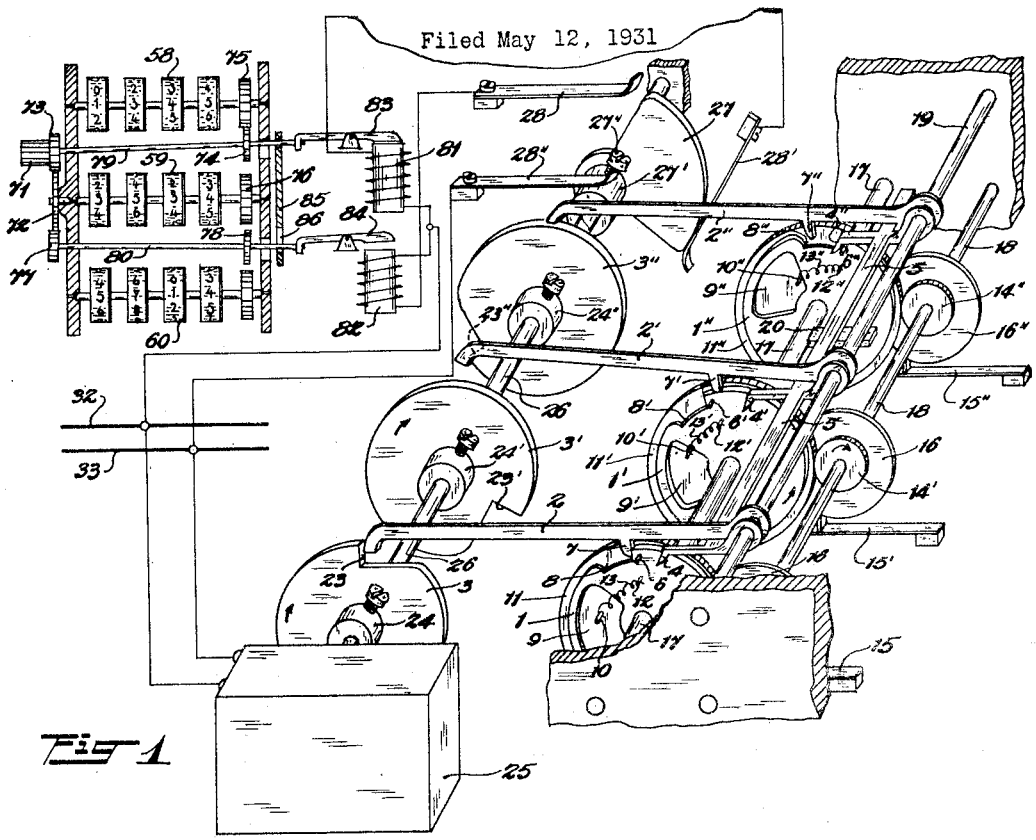
Fig. 1 is a diagrammatic view illustrating the present preferred embodiment of the invention in connection with the control of a multiple rate of electricity meter.

The present invention has for its object the provision of a novel and improved apparatus particularly adapted for the distant control of multiple rate meters or switching mechanism. A further object of the invention is the provision of a controlling mechanism, the operation of which is effected by actuation at predetermined frequencies to effect predetermined operations. Another object of the invention is the provision of a controlling mechanism which is actuated by any one of several predetermined frequencies and further operation, after actuation at any one frequency, can be effected only by actuation at a different frequency. Still another object of the invention is the provision of a novel frequency-controlled meter-controlling mechanism which is reliable and positive in its operation and is not easily placed out of adjustment.

In accordance with the present invention, the controlling mechanism comprises a plurality of interrelated, frequency-actuated mechanisms, one of said mechanisms being provided for each of the several operations to be performed, said mechanisms controlling other mechanisms which are only brought into operation towards the end of the control period. As embodied, a plurality of frequency-actuated control mechanisms are provided, each of which is responsive to a predetermined frequency only, and coacts with the remaining frequency-actuated mechanisms to control the operation of switching mechanism or electricity metering apparatus. Preferably, the frequency-controlled mechanisms are so interrelated that the operation of any one causes the corresponding switching or metering operation to be effected, and the frequency-actuated mechanisms are thereby rendered inoperative and can again be brought into action only after another of the frequency-actuated mechanisms has been actuated, thereby insuring a successful and accurate operation of the controlling device as a whole.

It will be understood that the foregoing general description and the following detailed description as well are exemplary and explanatory of the invention, but are not restrictive thereof.

Referring now in detail to the present preferred and illustrative embodiment of the invention shown in the accompanying drawing, the controlling mechanism is illustratively shown in connection with the distant control of a multiple rate meter, although it is applicable to the distant control of other apparatus. While any suitable form of multiple rate meter may be employed, the invention is described in connection with such a meter which includes three totalizing registers 58, 59 and 60 of conventional construction adapted to be driven by an electricity meter not shown. The meter drives pinion 71 which in turn drives gear 72 by means of pinion 73. Mounted on the same shaft 79 as pinions 71 and 73 is another pinion 74 which may be moved alternatively into engagement with gear 75 or 76, so as to drive either of the two upper totalizing registers 58 or 59. Another pinion 77 is similiarly mounted on an oscillatable shaft 80, which also carries pinion 78 adapted to be moved into engagement with either of the two lower registers 59 or 60, alternatively. For shifting the pinions 74 and 78 out of driving engagement with certain of the registers and into driving engagement with others, electromagnets 81 and 82 are provided and pivoted armatures 83 and 84 carry the bearings for the outer ends of the shafts 79 and 80 so that as a magnet is energized a pinion is raised, and when the magnet is de-energized, the pinion is dropped. For lifting pinion 78 out of driving engagement with the lower totalizing register 60, a slidable plate 85 is mounted at one side of the register frame and is provided with a slot 86 to receive the lower pinion shaft 80, so that as the upper shaft 79 is raised, the lower shaft 80 is placed out of engagement with the driving gear for the lower frame, while when the upper pinion 74 is in its lower position, the lower pinion 78 may be moved into driving engagement with either of the totalizing registers 59 or 60.

As illustratively shown in Figure 1 of the drawing, controlling mechanism is provided for controlling the three alternative operations, and this controlling mechanism comprises three frequency controlled devices, each of which comprises a controlling cam 1, 1' or 1", a stop lever 2, 2' or 2", and a notched disc 3, 3' or 3". The controlling cams 1, 1' and 1" are provided with pins 6, 6' and 6" which coact with their tripping fingers 4, 4', 4" pivotally mounted about a common shaft 19 and connected together for movement in unison by connecting bar 5. Each of the controlling discs 1, 1' and 1" is provided with a notch or recess 8, 8', 8" in its periphery, adapted to receive the projections 7, 7' and 7" depending from the stop levers 2, 2', 2" for the purpose of holding the levers in raised or lowered position. For the purpose of rotating the cam discs 1, 1' and 1" in certain of their positions, the discs are provided with apertures 9, 9' and 9" through which projects a pin 10, 10' and 10" mounted upon the adjacent gears 11, 11', 11", and between the pin 10, 10', 10" and another pin 12, 12', 12" is tensioned a small coil spring 13, 13', 13", thereby permitting relative movement of the gears 11, 11', 11" and cam discs 1, 1', 1", so as to tension the spring.

For individually driving the gears 11, 11', 11" and thereby the cam discs 1, 1', 1", there are provided the frequency-actuated driving mechanisms comprising a resonance spring 15, 15', 15" having at its outer and vibrating end an upwardly-directed projection which engages and advances the periphery of the driving discs 16, 16', 16", which can rotate in only one direction. Discs 16, 16', 16" are freely and independently rotatable on shaft 18, but each is rigid with respect to its corresponding pinion 14, 14', 14", which meshes with the gear 11, 11', 11". Suitable means, not shown, are provided for driving the resonance spring and the springs are tuned so that they may be selectively and individually actuated by different frequencies. Cam discs 1, 1', 1" and their gears 11, 11', 11" are freely-rotatable about the shaft 17 but are held thereon against axial movement.

For holding the tripping fingers 4, 4' and 4" in operative position, a stop 20 is provided against which the connecting bar 5 normally rests, the stop 20 being rigidly secured to the shaft 19 about which the tripping fingers of the stop levers 2, 2', 2" are pivoted.

Notched discs 3, 3', 3" are each rigidly held on shaft 26 by means of the set screw collars 24, 24', 24" and have their notches angularly spaced relatively to each other, so that the stop-engaging faces 23, 23' and 23" are spaced approximately 120° from each other. Means are also provided normally tending to rotate the shaft 26 and the discs 3, 3', 3", and for this purpose any suitable driving means 25 may be provided, such as a Ferraris disc motor or a resonant reed driving mechanism energized by the normal frequency of the current flowing in mains 32, 33.

For controlling the operation of the multiple rate meter in accordance with the actuation of the controlling mechanism, a contact segment 27 is provided and is rigidly secured to shaft 26 by means of collar 27' and set screw 27" and cooperates with three contact springs 28, 28' and 28", contact springs 28 and 28' being adapted to contact with the periphery of the conducting segment 27 while contact spring 28" is maintained in contact with collar 27'. Contact springs 28 and 28' are electrically connected with the magnets 82 and 81, respectively, while contact spring 28" is connected to the main 33.

With the mechanism shown in the position of Figure 1, contact spring 28' is electrically connected with contact spring 28"; a rotation of shaft 26 through 120° places the segment 27 out of contact with springs 28, 28'; and a further rotation of 120° contacts the spring 28 with the segment 27 energizing magnet 82.

The operation of the above-described mechanism may be briefly described as follows:—

Assuming the parts to be in the position shown in Fig. 1, resonant reed 15" is vibrated causing gear 11'' to be rotated and thereby driving the cam disc 1''. After cam disc 1'' has been rotated to a very slight extent, pin 6'' lifts the tripping lever 4'' and this in turn causes all of the stopping levers 2, 2', 2'' to be lifted, thereby releasing notched disc 3, which is immediately rotated by motor 25. As stopping lever 2 is raised the depending finger 7 is lifted out of engagement with notch 8 and spring 13 advances the camming disc 1 so as to hold the stopping lever 2 in raised position. The rotation of the notched discs on shaft 26 continues until the stopping lever 2'' engages the face 23'', both electromagnets 81 and 82 being deenergized. Resonant reed 15'' is then driven until the depending finger 7'' is brought against the right-hand edge of recess 8'', stopping cam disc 1'', and a slight tension has been placed on spring 13''.

After the above operation has been performed, further actuation of the controlling mechanism can be effected only by actuation of either of the driving resonant reed mechanisms 15 or 15', inasmuch as the mechanism connected with resonant reed 15'' has been rendered temporarily inoperative by the completion of its cycle. Assuming that the frequency to which resonant reed 15 is responsive is impressed upon the controlling circuit, cam disc 1 would be rotated and in the course of its rotation would lift tripping fingers 4 at a time when recess 8 permitted stopping lever 2 to drop. As finger 4 is lifted, the finger 4'' would also be lifted, raising the stopping lever 2'' and permitting further rotation of shaft 26 and segment 27. Rotation of segment 27 would then continue under the driving influence of motor 25 until it assumed the position shown in Fig. 1, and resonant spring 15 would continue to be actuated until finger 7 had engaged the right-hand edge of recess 8 and spring 13 had been tensioned as shown in Fig. 1.

The similar operation of the intermediate controlling mechanism comprising parts 15', 1', 4', 7' and 3' would be likewise effected by actuation of the resonant spring mechanism 15' at its proper frequency, which is different from that of either resonant spring mechanism 15 or 15''.

Figures 2, 3:
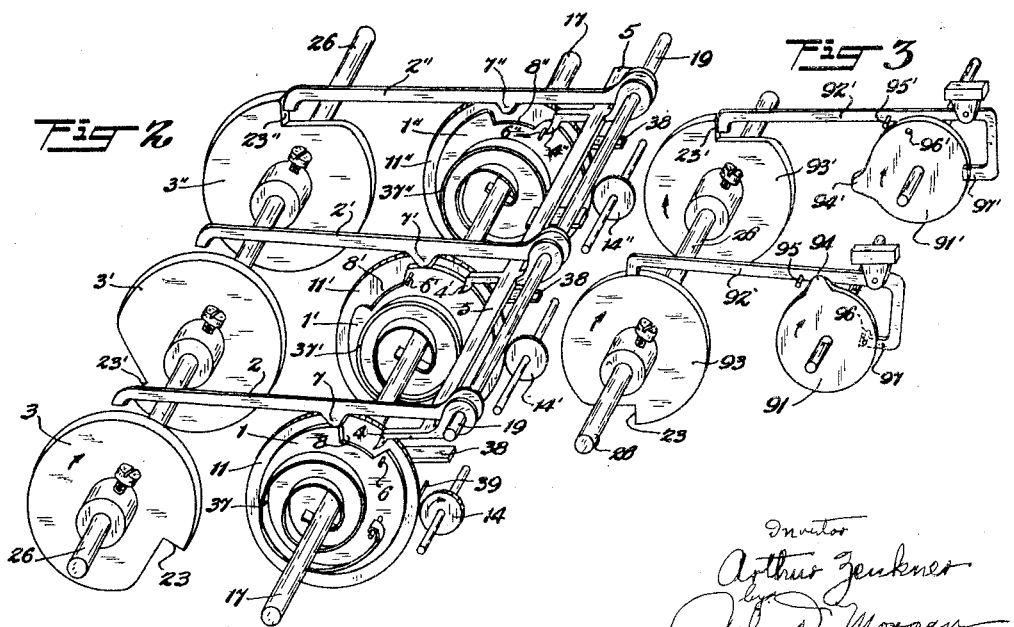
Fig. 2 is a similar view of a modified embodiment of the present invention.
Fig. 3 is also a diagrammatic view illustrating a further modification of the invention.

A modified embodiment of the invention illustrated in Figure 2 of the drawing differs in several of its elements from the embodiment previously described. In this embodiment, the shaft 17 is stationary and the cam discs 1, 1' and 1'' are rigidly fastened to their respective gears 11, 11' and 11''. A spiral spring 37, 37', 37'' is fastened to each of the cam discs and to the shaft 17 and tends to rotate the cam discs in a clockwise direction. The resonant driving mechanisms 14, 14', 14'' are each tuned to a different frequency and are adapted to be individually and selectively operated. Each of the gears 11, 11' and 11'' is provided with a pin 39 projecting laterally therefrom, which cooperates with stop 38 to limit the counter-clockwise rotation of the gears as they are driven by the resonant driving mechanism 14, 14' and 14''. Furthermore, as distinguished from the previously-described embodiment, the resonant spring drives are not secured against reverse rotation, and after the actuation of the resonant mechanism has ceased, reverse rotation thereof is permitted under influence of the springs 37, 37', 37''.

In the operation of this embodiment, and assuming that the parts are initially positioned as shown in Figure 2 of the drawing, resonant driving mechanism 14' is in operation and has just brought the stopping lever 2'' to stopping position. After actuation of the resonant mechanism 14' has ceased, spring 37' will cause clockwise rotation of disc 1' until pin 6' is positioned against the point of tripping finger 4', thereby preventing further rotation of disc 1', and permitting stopping lever 2' to drop. Then, assuming that resonant driving mechanism 14 is brought into operation, disc 1 and gear 11 are rotated in a counter-clockwise direction and against the tension of spring 37. Pin 6 then lifts tripping finger 4, raising the connecting bar 5, and all of the levers 2, 2' and 2'' are raised, releasing the pins 6' and 6'' from engagement with the tripping fingers 4', 4'' and permitting camming discs 1' and 1'' to rotate in a clockwise direction to their normal position of rest. Simultaneously with the release of the pin 6', 6'', and the raising of stopping lever 2'', slow rotation of the shaft 26 and segment 27 is permitted. On further rotation of the cam disc 1, tripping finger 4 drops off pin 6 and the depending member 7 is permitted to drop into recess 8, thereby positioning the outer end of stopping lever 2 against the periphery of notch disc 3 so that it is ready to engage the face 23 of this notch disc after further rotation of the shaft 26. In case disc 1 is rotated too far counter-clockwise, it rotates in a clockwise direction under the influence of spring 37 as soon as the driving by resonant mechanism 14 ceases, and this clockwise rotation continues until the pin 6 is brought to rest against the left hand side of the tip of the tripping finger 4, in which position it remains until another of the resonant mechanisms is actuated.

When it is desired to change the registration of the meter, the proper resonant mechanism 14' or 14'' is energized, which causes the corresponding cam disc 1' or 1'' to be rotated, raising all the tripping fingers 4, 4', 4'' and permitting the setting of the proper stopping lever 2', 2'' as well as the return to normal position of the cam disc 1, after the stopping lever 2 has been raised to permit further rotation of the shaft 26.

In substantially all its other respects, the operation and construction of this modification of the invention is identical with that of the modification first described.

A further modification of the controlling mechanism, and illustrative of certain aspects of the invention, is shown in Figure 3 of the drawing. In this embodiment, provision is made for a performance of only two different operations, although it is to be understood that the same general type of mechanism can be employed for the control of a larger number of operations through the addition of other units. As embodied, two controlling mechanisms, each actuated by a resonant spring drive, are provided, each of said controlling mechanisms comprising a controlling cam 91, 91′, a stop lever 92, 92′ and a notched disc 93, 93′. The several controlling cams and the stop levers are mounted independently of each other, while the notched discs are mounted on a common shaft 26 corresponding with the shaft 26 of the previously-described embodiment. The controlling cams 91, 91′ are each provided with small projections 94, 94′ coacting with pins 95, 95′ mounted on the levers 92, 92′ and also with a pin 96, 96′ coacting with the downwardly and inwardly bent end 97, 97′ of levers 92, 92′, respectively.

The notched discs 93, 93′ are each provided with a stop-engaging face 23, 23′ adapted to cooperate with stop levers 92, 92′, respectively, and the discs are angularly disposed relatively to each other on their common shaft 26, in accordance with the angle required by the controlling operations performed thereby.

In the operation of this modified embodiment of the invention just described, the controlling shaft 26 is held against rotation, in the position shown, by cooperation of the stop lever 92′ with the notched face 23′. As the resonant driving mechanism for controlling cam 91′ is driven at its particular resonant frequency, the cam is rotated and projection 94′ raises pin 95′ and thereby stopping lever 92′, releasing the disc 93′, and permitting rotation of controlling shaft 26. Pin 96′ is then brought into engagement with the downwardly and inwardly projecting end 97′ of stop lever 92′, thereby preventing further rotation of the controlling cam 91′. Controlling shaft 26 and notched discs 93 and 93′ are rotated under the influence of their driving motor until the stop-engaging face 23 engages with the outer end of stop lever 92, at which time stop lever 92 will have been moved to its lower position, in which clearance is given to pin 96 so that it is permitted to pass end 97 upon subsequent rotation of the controlling disc 91, at whatever time controlling disc 91 is driven by the selective and individual actuation of this resonant driving mechanism.

The invention in its broader aspects is not limited to the specific mechanisms shown and described but departures may be made therefrom within the scope of the accompanying claims without departing from the principles of the invention and without sacrificing its chief advantages.

What I claim is:—

1. Meter controlling mechanism including in combination a shaft provided with a plurality of angularly spaced stops, means for rotating the shaft and a plurality of selectively actuated frequency responsive means for selectively releasing the stops.

2. Meter controlling mechanism including in combination a shaft provided with a plurality of angularly spaced stops, means for rotating the shaft, a plurality of selectively actuated frequency responsive means, one for each stop, for selectively releasing the stops, and means for momentarily releasing all the stops whereby the shaft is permitted to rotate a predetermined amount.

3. Meter controlling mechanism including in combination a shaft provided with a plurality of angularly spaced stops, means for rotating the shaft, a plurality of frequency responsive means, one for each stop, stop releasing means driven by the frequency responsive means, and means for momentarily releasing all the stops on release of any one.

4. Meter controlling means including in combination a shaft provided with a plurality of angularly spaced stops, means for rotating the shaft, a plurality of frequency responsive means, one for each stop, stop releasing means driven by the frequency responsive means, and means for simultaneously and momentarily releasing all the stops on actuation of any one stop releasing means.

5. Meter controlling means including in combination a shaft provided with a plurality of angularly spaced stops, means for rotating the shaft, a plurality of frequency responsive means, one for each stop, stop releasing means driven by the frequency responsive means, means for returning the stop releasing means to normal position, and means operative to hold one of the stop releasing means in position for stopping the shaft.

6. Meter controlling means including in combination a shaft provided with a plurality of angularly spaced stops, means for rotating the shaft, a plurality of selectively actuated resonant driving means, stop releasing means driven by the driving means, means for rendering the stop releasing means inoperative after actuation, and means for rendering the stop releasing means operative by actuation of another driving means.

7. Meter controlling means including in combination a shaft provided with a plurality of angularly spaced stops, means for rotating the shaft, a plurality of selectively actuated driving means, stop setting and releasing means driven by the driving means, means for rendering the stop releasing means temporarily inoperative after actuation, and means for restoring the stop releasing means to operative condition by actuation of another driving means.

8. Meter controlling means including in combination a shaft provided with a plurality of notched discs having the notches angularly spaced relative to each other, a plurality of individually operated stop levers cooperating with the discs, a plurality of stop setting and releasing means, and means for releasing the stop in operation by operation of another stop setting means.

9. Meter controlling means including a combination a shaft provided with a plurality of notched discs having the notches angularly spaced relative to each other, a plurality of individually operated stop levers cooperating with the discs, a plurality of stop setting and releasing means, means for releasing the stop in operation by operation of another stop setting means, and frequency actuated means for controlling the stop releasing and setting means.

10. Meter controlling means including in combination a shaft provided with a plurality of notched discs having the notches angularly spaced relative to each other, a plurality of individually operated stop levers cooperating with the discs, a plurality of stop setting and releasing means, means for selectively and individually driving the stop setting and releasing means, and means for holding in stop setting position the stop setting and releasing means corresponding to the operative stop.

11. Meter controlling means including in combination a shaft provided with a plurality of notched discs having the notches angularly spaced relative to each other, a plurality of individually operated stop levers cooperating with the discs, a plurality of stop setting and releasing means, means for selectively and individually driving the stop setting and releasing means, means for holding in stop setting position the stop setting and releasing means corresponding to the operative stop, and means for releasing the stop setting means on actuation of another driving means.

12. A resonant spring controlling mechanism including in combination a rotatable member and a plurality of cooperating controlling means therefor, each of said controlling means comprising a notched disc, a stop lever to engage the notch in said disc, a resonant spring driving means responsive to a definite frequency, and a stop lever controlling cam driven by the driving means.

13. A resonant spring controlling mechanism including in combination a rotatable member and a plurality of cooperating controlling means therefor, each of said controlling means comprising a notched disc, a stop lever to engage the notch in said disc, a resonant spring driving means responsive to a definite frequency, and a stop lever controlling cam driven by the driving means, and means for releasing the stop last actuated by actuation of another controlling means.

14. A resonant spring controlling mechanism including in combination a plurality of similar controlling cams, means for selectively and individually driving the controlling cams, stop levers to be raised and lowered by said cams, a pin projecting from each cam, a member cooperating with each pin and in the path of each pin to be moved thereby, and means for raising all the stop levers to raised position by movement of said member.

15. A resonant spring controlling mechanism including in combination a plurality of similar controlling cams, means for selectively and individually driving the controlling cams, stop levers to be raised and lowered by said cams, a pin projecting from each cam, a member cooperating with each pin and in the path of each pin to be moved thereby and normally preventing reverse rotation of the controlling cams, means for moving all the stop levers to raised position by movement of said member, and spring means for reversely driving the controlling cams as said members are raised.

16. Meter controlling mechanism including in combination a shaft provided with a plurality of angularly spaced stops, means for rotating the shaft, a plurality of frequency responsive means, one for each stop, delayed action stop releasing means driven by the frequency responsive means, and means for momentarily releasing all the stops on release on any one.

17. Meter controlling means including in combination a shaft provided with a plurality of angularly spaced stops, means for rotating the shaft, a plurality of frequency responsive means, one for each stop, stop releasing means brought into operation after operation of said frequency responsive means and driven by the frequency responsive means, and means for simultaneously and monemtarily releasing all the stops on actuation of any one stop releasing means.

18. Meter controlling means including in combination a shaft provided with a plurality of angularly spaced stops, means for rotating the shaft, a plurality of selectively actuated resonant driving means, stop releasing means driven by the driving means, means for rendering the stop releasing means inoprative after actuation, and means for rendering the stop releasing means operative by continued actuation of another driving means.

In testimony whereof, I have signed my name to this specification.

ARTHUR ZENKNER.